(12) United States Patent
Webb-Johnson

(10) Patent No.: US 10,027,621 B2
(45) Date of Patent: Jul. 17, 2018

(54) SYSTEM FOR CLASSIFYING AN INTERNET PROTOCOL ADDRESS

(75) Inventor: Mark Crispin Webb-Johnson, Kowloon (CN)

(73) Assignee: Network Box Corporation Limited, Kowloon (HK)

( * ) Notice: Subject to any disclaimer, the term of this patent is extended or adjusted under 35 U.S.C. 154(b) by 630 days.

(21) Appl. No.: 12/341,835

(22) Filed: Dec. 22, 2008

(65) Prior Publication Data

US 2009/0248790 A1    Oct. 1, 2009

Related U.S. Application Data

(63) Continuation-in-part of application No. PCT/IB2007/001968, filed on Jun. 29, 2007.

(30) Foreign Application Priority Data

Jun. 30, 2006   (AU) ................................ 2006903547

(51) Int. Cl.
G06F 15/16 (2006.01)
H04L 29/12 (2006.01)
H04L 29/08 (2006.01)

(52) U.S. Cl.
CPC .... H04L 61/1511 (2013.01); H04L 29/12066 (2013.01); H04L 29/1282 (2013.01);
(Continued)

(58) Field of Classification Search
CPC ............. H04L 61/1511; H04L 29/2066; H04L 61/6013; H04L 67/1002
(Continued)

(56) References Cited

U.S. PATENT DOCUMENTS 6,332,158 B1 * 12/2001 Risley ............... G06F 17/30887
707/E17.115
6,470,389 B1    10/2002 Chung et al.
(Continued)

FOREIGN PATENT DOCUMENTS

CN     1489069 A    4/2004

OTHER PUBLICATIONS

Eidnes, H., et al., "Classless IN-ADDR.ARPA delegation," IETF RFC 2317, Mar. 1998, http://www.ietf.org/rfc/rfc2317.txt?number=2317.
(Continued)

Primary Examiner — John B King
Assistant Examiner — Darshan Dhruv
(74) Attorney, Agent, or Firm — Seed IP Law Group LLP

(57) ABSTRACT

A system for classifying an Internet protocol (IP) address, including: a data store for storing client profile data associated with a client, the client profile data including an Internet protocol address of a server; and a processor for receiving a resolved Internet protocol address from the client, and determining whether the resolved Internet protocol address corresponds to a second server associated with the first server. The data store includes configuration data representing Internet protocol addresses corresponding to servers in a server farm, and the processor determines that the servers are associated and part of the server farm when the resolved IP address corresponds to one of the IP addresses of the configuration data. The resolved IP address is received with a client request, and the request is allowed when the second server is associated with the first server.

19 Claims, 5 Drawing Sheets

(52) U.S. Cl.
CPC ...... *H04L 61/6013* (2013.01); *H04L 67/1002* (2013.01); *H04L 67/1006* (2013.01)

(58) Field of Classification Search
USPC ........................................................ 709/245
See application file for complete search history.

(56) References Cited

U.S. PATENT DOCUMENTS

| | | | | |
|---|---|---|---|---|
| 7,418,507 | B2* | 8/2008 | Kruse | H04L 29/12009 709/203 |
| 2001/0006523 | A1* | 7/2001 | Kriens | H04L 12/4633 370/401 |
| 2002/0143918 | A1 | 10/2002 | Soles et al. | |
| 2002/0156875 | A1 | 10/2002 | Pabla | |
| 2004/0133688 | A1 | 7/2004 | Takamatsu | |
| 2005/0111384 | A1* | 5/2005 | Ishihara et al. | 370/254 |
| 2005/0259654 | A1* | 11/2005 | Faulk, Jr. | H04L 29/12009 370/392 |
| 2006/0026177 | A1* | 2/2006 | Howell | G06F 9/5027 |
| 2006/0031319 | A1* | 2/2006 | Nelson | G06Q 10/107 709/206 |
| 2006/0031385 | A1* | 2/2006 | Westerdal | 709/217 |
| 2006/0056418 | A1* | 3/2006 | Rizzuto | H04L 61/1511 370/395.52 |
| 2007/0160033 | A1 | 7/2007 | Bozinovski et al. | |
| 2008/0016233 | A1* | 1/2008 | Schneider | G06F 17/30887 709/230 |
| 2009/0254658 | A1* | 10/2009 | Kamikura | H04L 29/12066 709/225 |

OTHER PUBLICATIONS

Dai, G. et al., "Design and Implementation of DNS-based Load Balance Technology," Computer Engineering 28 (4):78-79, 147, Apr. 2002.

Mockapetris, P., "Domain Names—Implementation and Specification," IETF RCF 1035, Nov. 1987, http://www.ietf.org/rfc/rfc1035.txt?number=1035.

Shaikh, A. et al., "On the Effectiveness of DNS-based Server Selection," Proceedings of IEEE INFOCOM 2001—Twentieth Annual Joint Conference of the IEEE Computer and Communications Societies, vol. 3, pp. 1801-1810, Anchorage, AK, Apr. 22-26, 2001.

Wang, Y. et al., "The Algorithms of the DNS-Based Load Balancing System", Computer Engineering and Application, No. 4, 3 pages, Feb. 28, 2002.

* cited by examiner

SYSTEM FOR CLASSIFYING AN INTERNET PROTOCOL ADDRESS

BACKGROUND

Technical Field

The present invention relates to a system and method for classifying an Internet Protocol address, that is particularly useful for determining if the address corresponds to a server of a server farm.

Description of the Related Art

In a typical networked computing environment, a user may have a computer which connects via a local network (e.g. LAN or WAN) and a local network server to the Internet. In some environments, a proxy server (which may be coincident with the local network server) intercepts and interprets commands being transmitted between the Internet and a client, e.g. an e-mail client or MUA (Mail User Agent) running on a user's computer. The proxy server may monitor the Internet Protocol (IP) addresses being accessed by the client for the purposes of, for example: security filtering; or providing the client with access to files in a local cache rather than on an external server (i.e. a server accessible only via a network such as the Internet).

Many large service providers have a farm of external servers providing a given service, which although only a single server name is published, might have addresses as follows:

| Server name | IP address |
|---|---|
| pop1.mailsp.com | 11.11.11.11 |
| pop2.mailsp.com | 11.11.11.12 |
| pop3.mailsp.com | 11.11.11.13 |
| pop4.mailsp.com | 11.11.11.14 |

When attempting to communicate with a server in a server farm, a client will start with only the published server name, e.g. 'pop.mailsp.com'. This server name is resolved by the Domain Name Service (DNS) into one of the IP addresses in the server farm. A proxy server monitoring the IP addresses being accessed by the client may not recognize the particular IP address as belonging to a server farm; for example, the proxy server may not recognize that an IP address corresponds to an external email server if the external email server is part of a server farm, and therefore has multiple potential IP addresses. If the proxy server does not recognize the IP address, it may fail to function desirably: for example, a proxy server may fail to realize the IP address corresponds to a particular email server or perform access restriction.

It is desired to address the above, or at least provide a useful alternative.

BRIEF SUMMARY

In accordance with one embodiment, there is provided a system for classifying an Internet protocol (IP) address, including:
 a data store for storing client profile data associated with a client, said client profile data including a first Internet protocol address of a first server; and
 a processor for receiving a resolved Internet protocol address from the client, and determining whether the resolved Internet protocol address corresponds to a second server associated with the first server.

One embodiment provides a method for classifying an Internet protocol (IP) address, including:
 storing identifying data for a first server;
 receiving an Internet protocol address from a client; and
 determining whether the Internet protocol address corresponds to a second server associated with said first server, using said identifying data.

One embodiment provides a method performed by a proxy server, including:
 storing identifying data for a server farm;
 receiving a Internet protocol (IP) address from a client; and
 determining whether said Internet protocol address corresponds to a server of said server farm, using said identifying data.

BRIEF DESCRIPTION OF THE SEVERAL VIEWS OF THE DRAWINGS

Embodiments are hereinafter described, by way of example only, with reference to the accompanying drawings in which.

DETAILED DESCRIPTION

Figure 1:
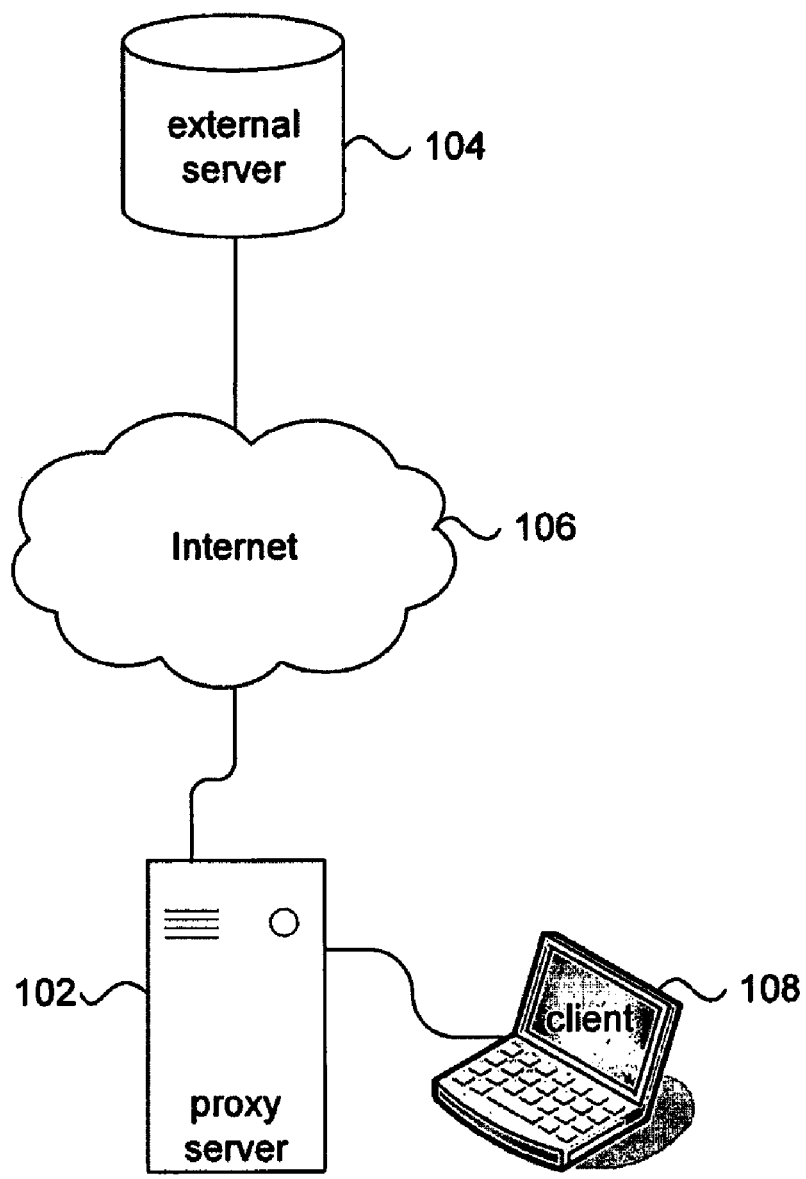
FIG. 1 is an arrangement of network components including a proxy server configured according to a preferred embodiment of the present invention.
Figure 2:
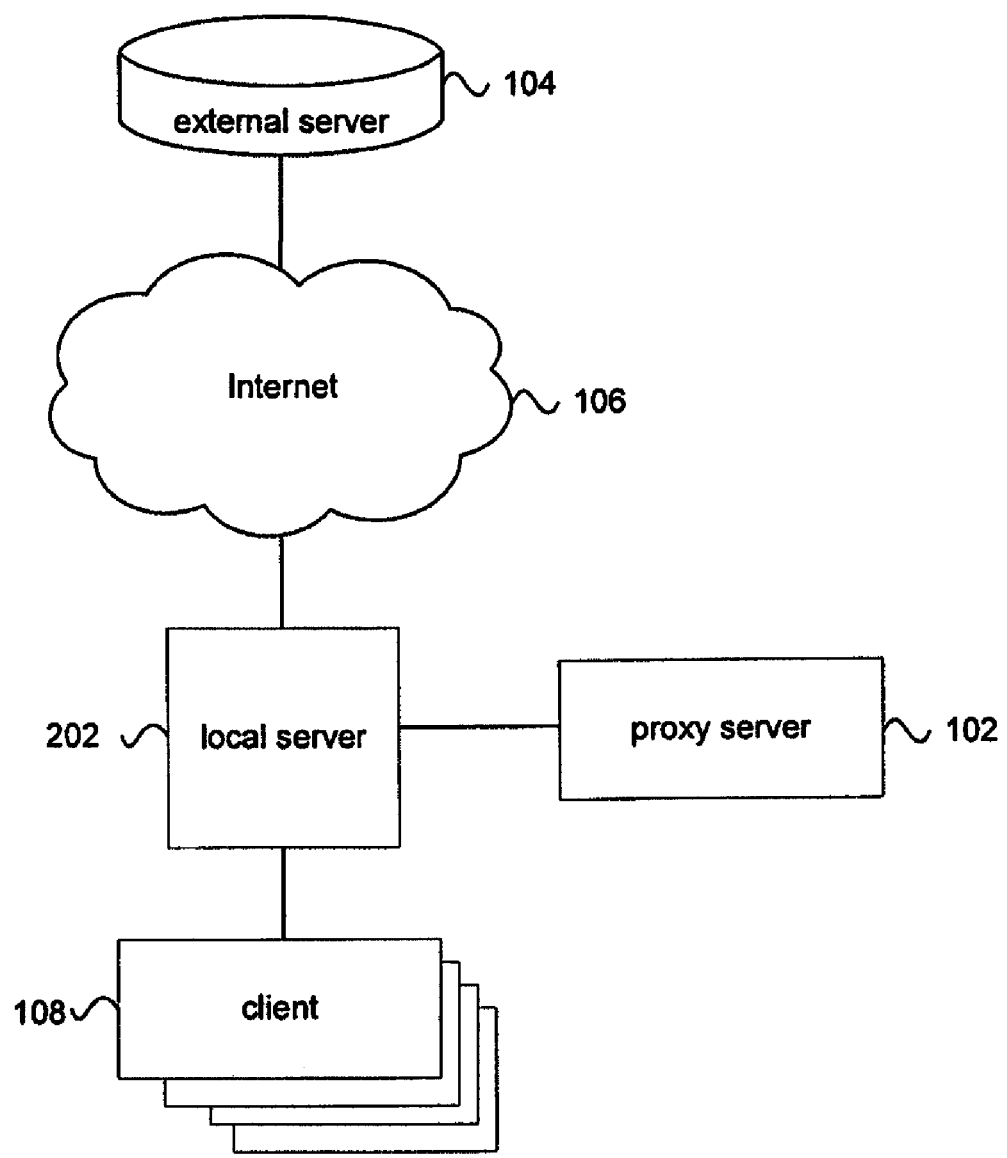
FIG. 2 is an alternative arrangement of network components including the proxy server.

FIGS. 1 and 2 show how a proxy server 102 can be configured to monitor the IP addresses being accessed by a client 108: the proxy server 102 may lie between the client 108 and the Internet 106, as shown in FIG. 1, or may be connected to a local network server 202, as shown in FIG. 2. The proxy server 102 is able to monitor IP addresses but not server names. The client 108 may be any client software running on a computer system or device that is able to establish an IP connection or session. The client 108 may be an e-mail client, such as Outlook by Microsoft Corporation or Mail by Apple, Inc., or a web browser, such as Internet Explorer, Safari or Firefox.

Figure 3:
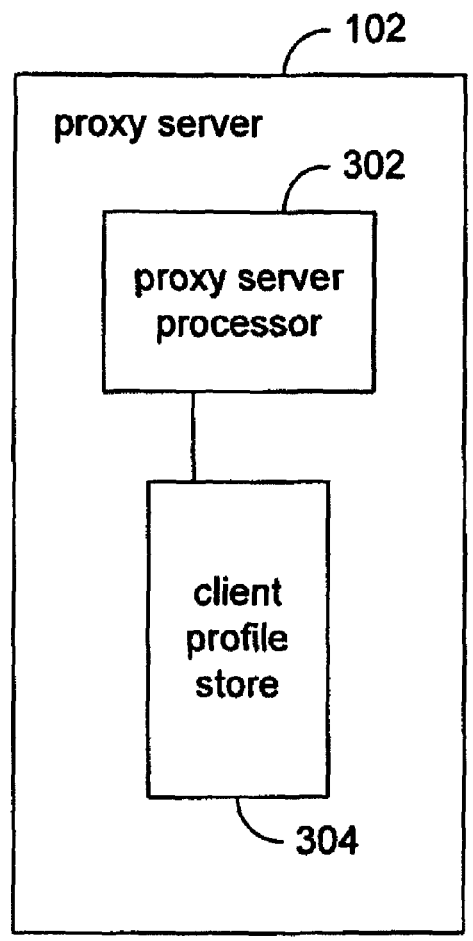
FIG. 3 is a schematic diagram of the proxy server.

The proxy server 102, as shown in FIG. 3, includes a proxy server processor 302, for performing processes such as detecting one or more IP addresses being accessed by the client 108, and a client profile store 304. The client profile store 304 includes network configuration data and client profile data for users, such as, for example, a username, and password for the user and an IP address of an external server 104. The client profile data may be used by proxy server 102 to access the external server 104 and act as a proxy for the client 108. The client profile data may also be used by the proxy server 102 to monitor when the client 108 attempts to access an external server 104 on the network 106 by recognizing IP addresses in requests from the client 108. The proxy server 102 can be implemented using a number of different hardware and/or software components. The server 102 may include a standard computer server, such as that produced by IBM Corporation or Apple, Inc., that runs an operating system, such as Unix, Linux or Mac OS X. The processor 302 may be provided by computer program code stored on the memory of the server, and written in a language such as C++, Perl or Ruby. The client profile store 304 can be provided by a database server (such as MySQL) that is used to maintain and provide access to the data held on the store 304 using memory of the server. The processes performed by the proxy server 102 can alternatively be performed, at least in part, by dedicated hardware circuits, such as ASICs or FPGAs, to replace at least part of the computer code and provide faster processing speeds.

The client 108 is connected to the proxy server 102 when requesting access to data on the external network 106. The proxy server 102 is configured with client profile data in the client profile store 304, and the client profile data may have been previously provided through communication between the client 108 and the proxy server 102, or via manual configuration of proxy server 102.

Figure 4:
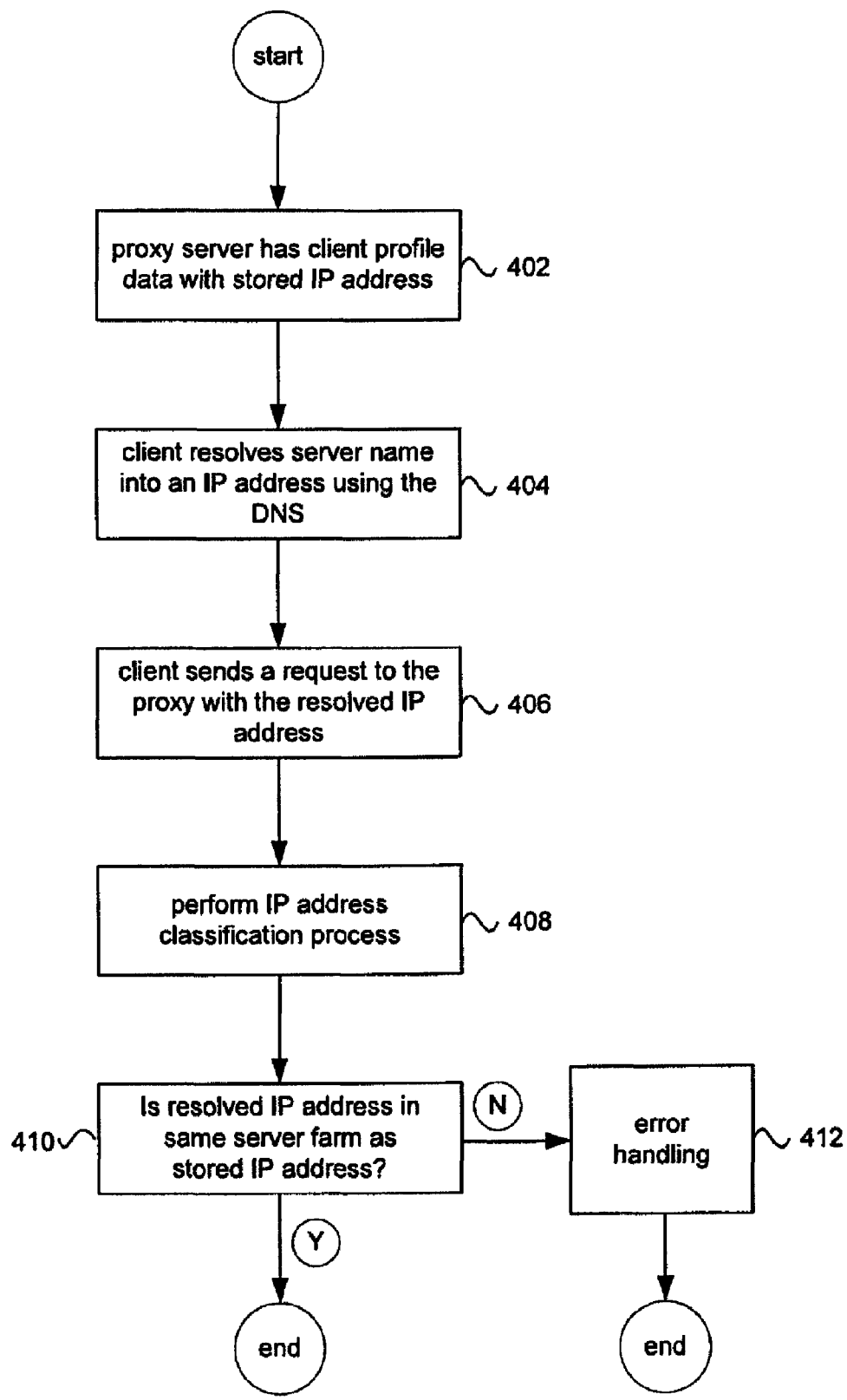
FIG. 4 is a flow chart of an access event process wherein the proxy server intercepts an IP address from a client.

The processor 302 of the proxy server 102 performs an access event process described below with reference to FIGS. 4 and 5. The process begins at step 402 with the proxy server 102 having client profile data, which includes a stored IP address known to correspond to a known external server 104. At step 404, the client wishing to access a server on the network 106 uses a published server name for the server, e.g. pop.mailsp.com, to send a DNS request to the Domain Name System (DNS) and obtains a resolved IP address for that server. As mentioned previously, the DNS may provide different IP addresses for the same given server name when the server name corresponds to a server farm which contains many actual servers. At step 406, the client sends a request containing the resolved IP address to the proxy server 102. The proxy server receives the request from the client 108 and determines whether the resolved IP address corresponds to the same server farm as the IP address stored in the client profile data. To perform this determination, the proxy server 102 carries out an IP address classification process at step 408, as described below. If the resolved IP address is found to correspond to a server in the same server farm as the server with the first IP address, the proxy server will recognize the client request and process the request accordingly. The proxy server may process a request from the client 108 to servers of the server farm in a particular manner. For example, only requests to servers of that server farm will be allowed or a particular download procedure may be performed for servers of that server farm, as described in the International (PCT) application entitled "Proxy Server" filed on the same day by the Applicant as this application (and herein incorporated by reference). If, however, the resolved IP address is not recognized at step 410, the proxy server 102 initiates an error handling procedure at step 412

Figure 5:
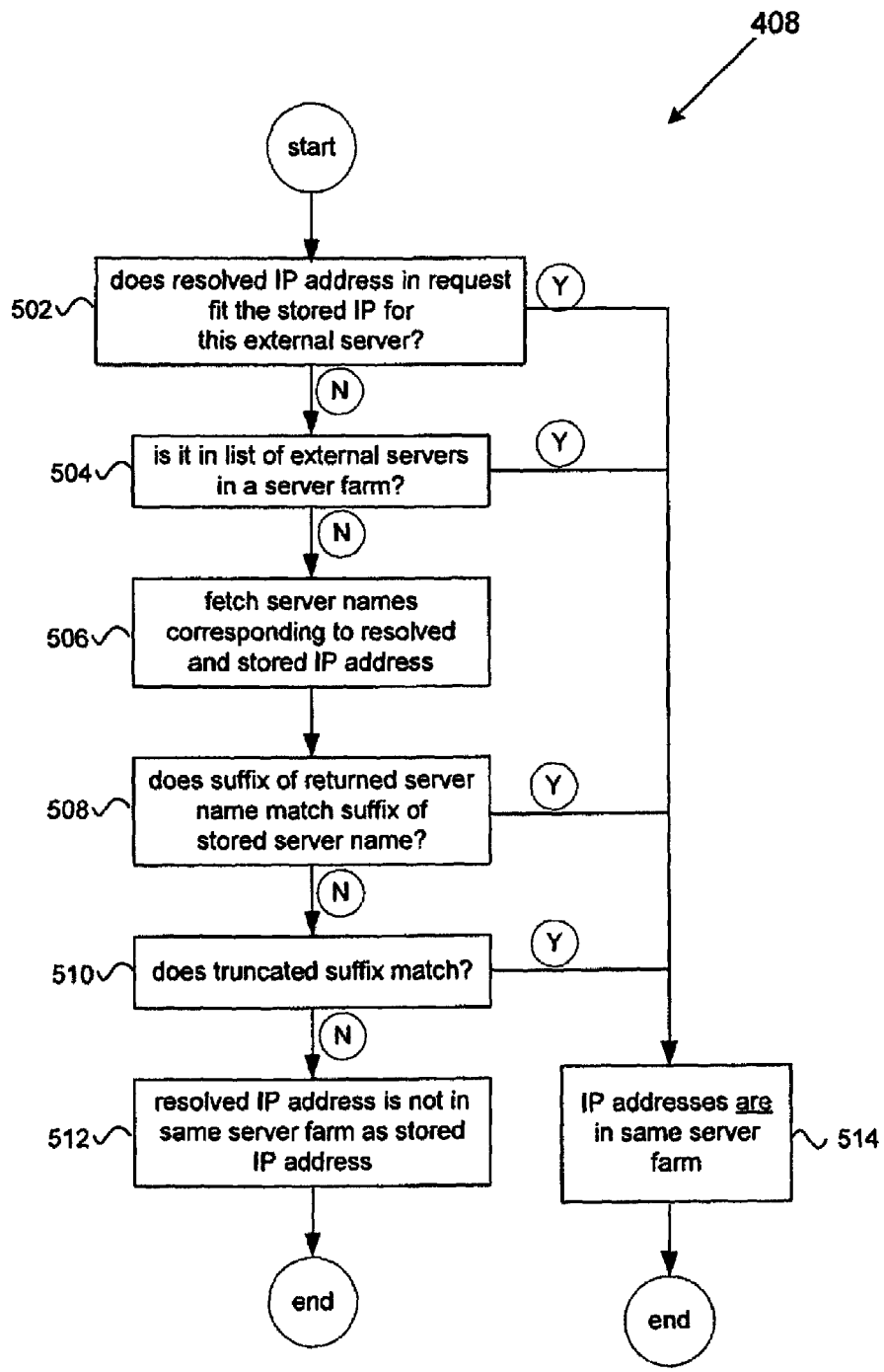
FIG. 5 is a flow chart of a process performed by the proxy server for classifying an IP address.

The IP address classification process 408, as shown in FIG. 5, determines whether a resolved IP address is for a server in the same server farm as a stored IP address. The process 408 compares the resolved IP address to a number of possible matching addresses in successive steps 502, 504, 508 and 510. Firstly, the resolved IP address (i.e. the address found in the client request at step 406 in FIG. 4) is compared to an IP address stored in the client profile data in client profile store 304—if the two IP addresses match, it is clear that they refer to the same server, and thus the same server farm. If, however, the IP addresses do not match at step 502, the resolved IP address is compared to a list of addresses of external servers that are known to correspond to one or more server farms; a list for servers in a server farm may be input to the memory of proxy server 102 manually, or may be automatically provided by another process. If the resolved IP address is found to correspond to one of the IP addresses in a server list that also contains the stored IP address of the client profile data, then both are considered to point to the same server farm. If the resolved IP address is not found listed in the same server farm as the stored IP address of the client profile data, the domain name system (DNS) is used to search for possible matches.

At step 506, the proxy server 102 performs a reverse DNS lookup process, as described in the Internet Engineering Task Force (IETF) RFCs 1035 and 2317 (http://www.ietf.org/rfc.html), to determine the server name corresponding to the resolved IP address and the server name corresponding to the stored IP address of the client profile data. If the suffix of the server name (e.g. 'mailsp.com') returned using the resolved IP address matches the suffix of the server name returned using the stored address at step 508, the IP addresses are held to be in the same server farm. If the suffixes do not match at step 508, the proxy server may truncate the suffixes to compare only the right most portions of the server names (e.g. mailsp.com or melbuni.edu.au) at step 510; if the truncated suffixes of the server names match, it is possible the IP addresses are from the same server farm. If, however, even the truncated suffixes of the server names do not match, then the proxy server concludes in step 512 that the IP addresses are not referring to the same server farm. The comparison and truncation steps (508, 510) may be configured to reach an arbitrary level of truncation, or an arbitrary length of the suffix; other examples of suffixes may be: public.mailsp.com, mail.dhs.nsw.gov.au, or even .au (although short suffixes will be less likely to identify a single server farm).

The classification process is not constrained by the size of the server groups, the nature of the protocols supported. Furthermore, the process is not dependent on the proxy 102 being able to intercept any protocol other than that which it was designed to intercept, e.g. it is not dependent on being able to intercept DNS traffic.

The classification process 408 can be illustrated using an example of a search for an email server 'pop5.mailsp.com' that lies in a server farm. The client 108 is configured to retrieve email from an external server 104 with the server name: 'pop.mailsp.com' using the POP3 protocol. The proxy server 102 has a stored client profile, including the client's username, password and IP address of its email server, which is '11.11.11.14'. Furthermore, the server farm containing the email server has a number of IP addresses, including the following which are listed in the memory of proxy server 102: 11.11.11.11, 11.11.11.12, 11.11.11.13 and 11.11.11.14.

Unknown to the proxy server 102, the DNS currently resolves the following server names to the following IP addresses, all corresponding to the 'pop.mailsp.com' server farm:

| | |
|---|---|
| pop1.mailsp.com | 11.11.11.11; |
| pop2.mailsp.com | 11.11.11.12; |
| pop3.mailsp.com | 11.11.11.13; |
| pop4.mailsp.com | 11.11.11.14; and |
| pop5.mailsp.com | 11.11.11.15. |

In this example, the client 108 attempts to access 'pop.mailsp.com'. The client uses the DNS to resolve 'pop.mailsp.com' (for this given request), to 11.11.11.15. When the proxy server 102 detects that client 108 is trying to access IP address 11.11.11.15 using the POP3 protocol, it attempts to match this resolved address with the stored address of the client profile data (i.e. '11.11.11.14')—at step 502 in FIG. 5—but it does not match. Then the proxy attempts to match the resolved address and the client profile address with a stored list of servers corresponding to the same server farm—at step 504; in this case, although the IP address of another server ('11.11.11.14') is stored for the 'pop.mailsp.com' server farm, the new address ('11.11.11.15') is not.

At the next step, 506, the proxy server 102 performs reverse DNS lookup to find a server name corresponding to the resolved IP address. In this case, the reverse DNS process, returns 'pop5.mailsp.com'. At the following step 508, the suffixes of the two names are then compared; in this case, 'mailsp.com' is the suffix in both cases, so the names are found to match, and the proxy server 102 treats the request from client 108 as if it were for the external server 104 that is normally used (whether this match identifies a server farm match depends on the selected comparison of the proxy server and the configuration of the server farm). The client profile stored on the proxy server is updated to reflect that the IP address of its email server is now '11.11.11.15'. Furthermore, the IP addresses for this server farm, listed in the memory of the proxy server, is amended to include the IP address '11.11.11.15'.

An example of the control flow and the data used is provided in the accompanying Appendix.

The processes performed by the proxy server 102, as described herein, can advantageously be used when the proxy server 102 is configured so as to form a proxy server as described in the patent specification of the International (PCT) patent application entitled "Proxy Server" filed by the Applicant on the same day as this application (and which is herein incorporated by reference).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

APPENDIX

| Configuration (Profile) Data Stored | | |
|---|---|---|
| Client configuration: | Server: pop3.mailsp.com | |
| Server configuration: | Server farm | |
| Server farm details: | Server | IP Address |
| | pop1.mailsp.com | 11.11.11.11 |
| | pop2.mailsp.com | 11.11.11.12 |
| | pop3.mailsp.com | 11.11.11.13 |
| | pop4.mailsp.com | 11.11.11.14 |
| Proxy server's configuration data for servergroup: | Servergroup name:<br>Value: | MailServiceProvider<br>11.11.11.11<br>pop1.mailsp.com<br>mailsp.com |

| Data and Control Flow | |
|---|---|
| 1. Client is configured with server name. | Server name: pop3.mailsp.com |
| 2. Client resolves server name. DNS system for server farm responds with an IP address relating to the server farm. | DNS system responds with IP address 11.11.11.12, corresponding to pop2.mailsp.com |
| 3. Client opens connection using appropriate protocol and IP address. | Client opens POP3 connection to 11.11.11.12. |
| 4. Proxy server intercepts connection to server. | Proxy server sees 11.11.11.12. |
| 5. Proxy server does reverse DNS lookup | Lookup yields reverse DNS name pop2.mailsp.com |
| 6. Proxy server consults servergroup data and finds match. | Searches through servergroups until it reaches servergroup MailServiceProvider. Fails to match on 11.11.11.11. Fails to match on pop1.mailsp.com. Matches on mailsp.com. |
| 7. Proxy server consults persistent state data for correct servergroup. | The persistent state for servergroup MailServiceProvider is indexed by username. The persistent state data may consist, for example, of mailbox content information, and be indexed (for each servergroup) by the username of the client profile data. |

The invention claimed is:

1. A system for classifying an Internet protocol (IP) address, including:
    one or more memories, which, in operation, store client profile data associated with a client, said client profile data including a first IP address of a first server; and
    processing circuitry, which, in operation, receives a resolved IP address associated with a request from the client, and uses said stored data to determine whether the resolved IP address corresponds to a second server associated with the first server, wherein the stored data includes configuration data representing IP addresses corresponding to servers in a server farm, and said processing circuitry, in operation, determines that the first and second servers are associated and part of said server farm when the resolved IP address corresponds to one of the IP addresses of the configuration data, wherein the processing circuitry, in operation, performs a reverse domain name system lookup process using the resolved IP address and the IP address of the first server to obtain respective corresponding first and second server names, and said first and second server names are compared to determine whether the servers are associated and in a same server farm, wherein:

when the comparison indicates the first and second servers are associated and part of the server farm, the processing circuitry, in operation, updates the client profile data to include the resolved IP address, adds the resolved IP address to the configuration data representing IP addresses corresponding to servers in the server farm and processes the request, otherwise, the processing circuitry, in operation, initiates error handling; and in response to receipt of a subsequent request with the resolved IP address, the processing circuitry, in operation, processes the subsequent request.

2. The system as claimed in claim 1, wherein the client profile data includes said configuration data.

3. The system as claimed in claim 1, wherein said processing circuitry, in operation, compares the suffixes of the server names.

4. The system as claimed in claim 1, wherein said processing circuitry, in operation, truncates the server names to perform a comparison.

5. The system as claimed in claim 1, wherein said server names are compared by comparing right most portions of the server names, the right most portions being respective subsets of the respective server names.

6. The system as claimed in claim 1 wherein the data store and processor are part of a proxy server.

7. A method for classifying an Internet protocol (IP) address, including:

storing identifying data for a first server, the identifying data including Internet protocol addresses corresponding to servers in a server farm and client profile data;

receiving an Internet protocol address associated with a request from a client;

determining whether the Internet protocol address corresponds to a second server associated with said first server, using said identifying data;

performing a reverse domain name system lookup process using the received IP address associated with the request from the client and a stored IP address of the first server to obtain respective corresponding first and second server names, and said first and second server names are compared to determine whether the servers are associated and in a same server farm; wherein when the comparison indicates the first and second servers are associated and in the same server farm, updating the client profile data associated with the client to include the received IP address, adding the received IP address to the identifying data to indicate the received IP address is associated with a server in the server farm, and processing the request, otherwise initiating error handling; and in response to receipt of a subsequent request associated with the received IP address, processing the subsequent request.

8. The method as claimed in claim 7, including comparing the suffixes of the server names.

9. The method as claimed in claim 7, including truncating the server names to perform a comparison.

10. The method as claimed in claim 7, wherein said server names are compared by comparing right most portions of the server names, the right most portions being respective subsets of the respective server names.

11. The method as claimed in claim 7 wherein the storing, receiving, and determining steps are performed by a proxy server.

12. A non-transitory computer-readable medium storing contents that cause a computing device to implement a method for classifying an Internet protocol (IP) address, the method including:

storing identifying data for a first server, the identifying data including Internet protocol addresses corresponding to servers in a server farm and client profile data;

receiving an Internet protocol address associated with a request from a client;

determining whether the Internet protocol address corresponds to a second server associated with said first server, using said identifying data;

performing a reverse domain name system lookup process using the received IP address associated with the request from the client and a stored IP address of the first server to obtain respective corresponding first and second server names, and said first and second server names are compared to determine whether the servers are associated and in a same server farm; wherein when the comparison indicates the first and second servers are associated and in the same server farm, updating the client profile data associated with the client to include the received IP address, adding the received IP address to the identifying data to indicate the received IP address is associated with a server in the server farm, and processing the request, otherwise initiating error handling; and in response to receipt of a subsequent request associated with the received IP address, processing the subsequent request.

13. The non-transitory computer-readable medium according to claim 12, wherein the method includes comparing the suffixes of the server names.

14. The non-transitory computer-readable medium according to claim 12, wherein the method includes truncating the server names to perform a comparison.

15. The non-transitory computer-readable medium according to claim 12, wherein said server names are compared by comparing right most portions of the server names, the right most portions being respective subsets of the respective server names.

16. A system for classifying an Internet protocol (IP) address, including:

a memory configured to store client profile data associated with a client, said client profile data including a first IP address of a first server; and processing circuitry configured to receive a resolved IP address from the client, and to determine whether the resolved IP address corresponds to a second server associated with the first server, wherein the processing circuitry is configured to perform a reverse domain name system lookup process using the resolved IP address and the IP address of the first server to obtain respective corresponding first and second server names, and said first and second server names are compared to determine whether the servers are associated and in a same server farm, wherein the processing circuitry is configured to:

when the comparison indicates the first and second servers are associated and part of the server farm, update the client profile data to include the resolved IP address, add the resolved IP address to configuration data representing IP addresses corresponding to servers in the server farm and process a request associated with the resolved IP address, otherwise initiate error handling; and in response to receipt of a subsequent request with the resolved IP address, process the subsequent request.

17. The system as claimed in claim 16, wherein said processor truncates the server names to perform a comparison.

18. The system as claimed in claim 16, wherein said server names are compared by comparing right most portions of the server names, the right most portions being respective subsets of the respective server names.

19. A system for classifying an Internet protocol (IP) address, including:
   one or more memories configured to store client profile data associated with a client, said client profile data including a first IP address of a first server; and
   processing circuitry configured to receive a resolved IP address associated with a request from the client, to determine whether the resolved IP address corresponds to a second server, and to determine, using the stored first IP address, whether the second server is associated with the first server, wherein the processing circuitry is configured to perform a reverse domain name system lookup process using the resolved IP address and the IP address of the first server to obtain respective corresponding first and second server names, and said first and second server names are compared to determine whether the servers are associated and in a same server farm, wherein the processing circuitry is configured to:
   when the comparison indicates the first and second servers are associated and part of the same server farm, update the client profile data to include the resolved IP address, add the resolved IP address to configuration data representing IP addresses corresponding to servers in the server farm and process the request, otherwise initiate error handling; and
   in response to receipt of a subsequent request associated with the resolved IP address, process the subsequent request.

* * * * *